United States Patent
Newell (10) Patent No.: US 10,543,920 B2
(45) Date of Patent: Jan. 28, 2020

(54) DEPLOYABLE FOOT REST ASSEMBLY

(71) Applicant: Thompson Aero Seating Limited, Craigavon (GB)

(72) Inventor: Keith Newell, Moneymore (GB)

(73) Assignee: Thompson Aero Seating Limited, Craigavon (GB)

(*) Notice: Subject to any disclaimer, the term of this patent is extended or adjusted under 35 U.S.C. 154(b) by 63 days.

(21) Appl. No.: 15/845,852

(22) Filed: Dec. 18, 2017

(65) Prior Publication Data
US 2018/0170551 A1    Jun. 21, 2018

(30) Foreign Application Priority Data

Dec. 19, 2016    (GB) .................................... 1621575.8

(51) Int. Cl.
*B64D 11/06* (2006.01)
*B60N 3/06* (2006.01)

(52) U.S. Cl.
CPC .......... *B64D 11/0643* (2014.12); *B60N 3/063* (2013.01)

(58) Field of Classification Search
CPC .... B64D 11/0643; B60N 3/063; B60N 2/995; B60N 3/06; A47C 7/5066; A47C 7/5068
USPC ............................. 297/423.15, 423.28, 85 R
See application file for complete search history.

(56) References Cited

U.S. PATENT DOCUMENTS

| 1,327,706 | A | * | 1/1920 | De Smet | B60N 3/063 |
| | | | | | 297/105 |
| 4,570,996 | A | * | 2/1986 | Rogers, Jr. | A47C 7/506 |
| | | | | | 297/68 |
| 5,020,817 | A | * | 6/1991 | Leib | A61G 5/00 |
| | | | | | 280/250.1 |
| 8,070,219 | B2 | * | 12/2011 | Walters | A47C 7/506 |
| | | | | | 297/182 |
| 2006/0238012 | A1 | | 10/2006 | Forgatsch | |

(Continued)

FOREIGN PATENT DOCUMENTS

| EP | 1707436 A1 | 10/2006 | |
| EP | 3034404 A1 * | 6/2016 | ............. B60N 3/063 |
| JP | 2014117303 A | 6/2014 | |

(Continued)

OTHER PUBLICATIONS

Extended European Search Report received in European Application No. EP17208237, dated Apr. 19, 2018, 7 pages.

(Continued)

*Primary Examiner* — Milton Nelson, Jr.
(74) *Attorney, Agent, or Firm* — Adler Pollock & Sheehan P.C (57) ABSTRACT

A foot rest installation comprising a base structure that includes a footwell and may be provided under a seat, in a bulkhead or in a console, and a foot rest assembly. The foot rest assembly has a deployable foot rest support structure and a first foot rest component comprising a flexible structure, for example a net, having a first end fixed with respect to the base structure at a first location, and a second end coupled to the foot rest support structure at a second location that is spaced apart from the pivot axis along a front-to-rear axis. When deployed, the foot rest support structure extends downward and rearward from the pivot axis to deploy the net in the footwell. When stowed, the foot rest support structure extends upward and rearward from the pivot axis.

21 Claims, 6 Drawing Sheets

(56) References Cited

U.S. PATENT DOCUMENTS

2009/0322139 A1 12/2009 Clough

FOREIGN PATENT DOCUMENTS

| WO | 2014052534 A1 | 4/2014 |
| WO | WO-2016013786 A1 | 1/2016 |

OTHER PUBLICATIONS

GB Search Report received for Application No. GB1621575.8, dated Jun. 16, 2017, 1 page.

* cited by examiner

DEPLOYABLE FOOT REST ASSEMBLY

CROSS REFERENCE TO RELATED APPLICATION

This application claims the benefit of United Kingdom Patent Application No. 1621575.8, filed Dec. 19, 2016, the entirety of which is incorporated herein by reference.

FIELD OF THE INVENTION

This invention relates to foot rests for seating in which seats are arranged in rows with one seat behind another seat. The invention relates especially, but not exclusively, to vehicle seating, particularly aircraft seating.

BACKGROUND TO THE INVENTION

When seats are arranged in rows it is common for the space beneath a seat in one row to be used as a footwell for a passenger seated in a corresponding seat of the row behind. It is known to provide a foot rest in the footwell to improve passenger comfort, but this compromises the ability to use the footwell as a storage space. It would be desirable therefore to provide a deployable foot rest assembly that would improve passenger comfort when deployed but minimize obstruction of the footwell when stowed.

SUMMARY OF THE INVENTION

A first aspect of the invention provides a foot rest installation comprising:
 a base structure including a footwell;
 a foot rest assembly operable between a stowed state and a deployed state, said foot rest assembly comprising:
  a foot rest support structure pivotable with respect to said base structure about a pivot axis that runs perpendicularly with a front-to-rear axis, said foot rest support structure having a free end distal said pivot axis; and
  a first foot rest component comprising a flexible structure having a first end fixed with respect to said base structure at a first location, and a second end coupled to said foot rest support structure at a second location that is spaced apart from said pivot axis along said front-to-rear axis,
  and wherein, in said deployed state, said foot rest support structure extends downward and rearward from said pivot axis to deploy said flexible structure in said footwell,
  and wherein, in said stowed state, said foot rest support structure extends upward and rearward from said pivot axis.

Preferably, said foot rest assembly includes a second foot rest component located at said free end of said foot rest support structure. Said second foot rest component typically comprises a foot plate. Said second foot rest may be pivotably mounted on said foot rest support structure for pivoting with respect to said foot rest support structure about an axis parallel with said pivot axis. The assembly may include a locking mechanism operable between a locked state in which it prevents the second foot rest from pivoting with respect to said foot rest support structure, and a non-locking state in which it allows the second foot rest to pivot with respect to said foot rest support structure.

The second foot rest may be slidable with respect to said foot rest support structure in a direction perpendicular with said pivot axis. There may be provided a locking mechanism operable between a locked state in which it prevents the second foot rest from sliding with respect to said foot rest support structure, and a non-locking state in which it allows the second foot rest to slide with respect to said foot rest support structure.

Preferred embodiments include a locking mechanism operable between a locked state in which it prevents the foot rest support structure from pivoting about said pivot axis, and a non-locking state in which it allows the foot rest support structure to pivot about said pivot axis.

In preferred embodiments, said foot rest support structure comprises first and second bars spaced apart in the direction of said pivot axis, each bar supporting a respective side of said flexible structure.

Typically said pivot axis is located at a second end of said foot rest support structure opposite said free end.

Said foot rest support structure may be pivotably coupled to said base structure for pivoting about said pivot axis.

Said second location may be at or adjacent said free end of said foot rest support structure.

In preferred embodiments said flexible structure comprises a sheet of flexible material, for example a polymer material or a fabric. Said flexible structure may comprise a net.

Preferably, in said stowed state said foot rest support structure holds said flexible structure in a raised position relative to said deployed state.

In preferred embodiments, said flexible structure has said first end fixed to said base structure at said first location.

Conveniently said first location and said pivot axis are at substantially the same height, in use, above a floor supporting the foot rest installation.

Preferably, in said stowed state, said free end of said foot rest support structure is located outside of, and preferably above, said footwell.

In typical embodiments, said base structure supports at least one seat, the or each seat comprising a seat pan and a seat back, said footwell being located underneath said seat pan, said pivot axis running perpendicularly with a front-to-rear axis of said seat. Along said front-to-rear axis of said seat, said first location may be in line with a front part of said seat and said pivot axis is in line with a rear part of said seat. Preferably, in said stowed state, said foot rest support structure extends upward and rearward from said pivot axis to position said free end at a rear part of said seat back.

Optionally a plurality of said seats are provided on said base structure, spaced apart in a direction parallel with said pivot axis to form a row of two or more seats.

In preferred embodiments said second foot rest component is held adjacent or against said rearward surface in said stowed state. Along said front-to-rear axis, said pivot axis may be in line with a rear part of said seat pan.

In preferred embodiments, said base structure comprises a seat support structure and a plurality of legs, said footwell being provided underneath said seat support structure, and typically between said legs. Said foot rest support structure may be pivotably coupled to said seat support structure for pivoting about said pivot axis. Said flexible structure may have said first end fixed to said seat support structure at said first location.

In preferred embodiments, said seat support structure comprises first and second parallel bars running perpendicular to said front-to-rear axis and, in use, parallel with a floor supporting the seating assembly, said first and second bars being spaced apart along said front-to-rear axis, and preferably being at substantially the same height above said floor in use. Said foot rest support structure may be pivotably coupled to said second bar for pivoting about said pivot axis. Said flexible structure may have said first end fixed to said first bar at said first location.

Optionally, said base structure comprises a bulkhead, said footwell being formed in said bulkhead.

Optionally, said base structure comprises a console, said footwell being formed in said console.

In preferred embodiments at least one actuator is coupled between the base structure and the foot rest support structure and is configured to control movement of the foot rest structure, preferably to control pivoting movement of the foot rest support structure. Said at least one actuator may be configured to hold the foot rest support structure in, and/or to urge it towards, a rest position in which the foot rest support structure is out of the stowed state, but not in a fully deployed position. Optionally, said at least one actuator is configured to provide a bias against movement of the foot rest support structure towards the fully deployed position and to balances the weight of the foot rest support structure when the foot rest support structure is in the rest position.

In preferred embodiments, a foot rest locking mechanism is provided for selectably locking said foot rest support structure in any selected one of a plurality of positions between said stowed state and a fully deployed position, and a user-operable device for operating said locking mechanism.

Optionally an actuator locking mechanism is provided for selectably locking said at least one actuator in any state of extension, and a user-operable device for operating said locking mechanism. Conveniently, the same user-operable device operates the foot rest locking mechanism and the actuator locking mechanism.

A second aspect of the invention provides a seating assembly comprising:
  a seat comprising a seat pan and a seat back;
  a base structure supporting the seat, the base structure providing a footwell underneath said seat pan;
  a foot rest assembly operable between a stowed state and a deployed state, said foot rest assembly comprising:
    a foot rest support structure pivotable with respect to said base structure about a pivot axis that runs perpendicularly with a front-to-rear axis of said seat, said foot rest support structure having a free end distal said pivot axis; and
    a first foot rest component comprising a flexible structure having a first end fixed with respect to said base structure at a first location, and a second end coupled to said foot rest support structure at a second location that is spaced apart from said pivot axis,
    wherein, along said front-to-rear axis, said first location is in line with a front part of said seat and said pivot axis is in line with a rear part of said seat,
    and wherein, in said deployed state, said foot rest support structure extends downward and rearward from said pivot axis to deploy said flexible structure in said footwell,
    and wherein, in said stowed state, said foot rest support structure extends upward and rearward from said pivot axis to position said free end at a rear part of said seat back.

A third aspect of the invention provides a seating installation comprising a seat and a foot rest installation of the first aspect of the invention located in front of said seat, wherein said footwell is positioned for use by a passenger seated in said seat. The seating installation may comprise a plurality of seats arranged in a row and a respective foot rest installation located in front of each seat, each footwell being positioned for use by a passenger seated in the respective seat.

Further advantageous aspects of the invention will be apparent to those ordinarily skilled in the art upon review of the following description of a specific embodiment and with reference to the accompanying drawings.

BRIEF DESCRIPTION OF THE DRAWINGS

An embodiment of the invention is now described with reference to the accompanying drawings in which.

DETAILED DESCRIPTION OF THE DRAWINGS

Figure 1:
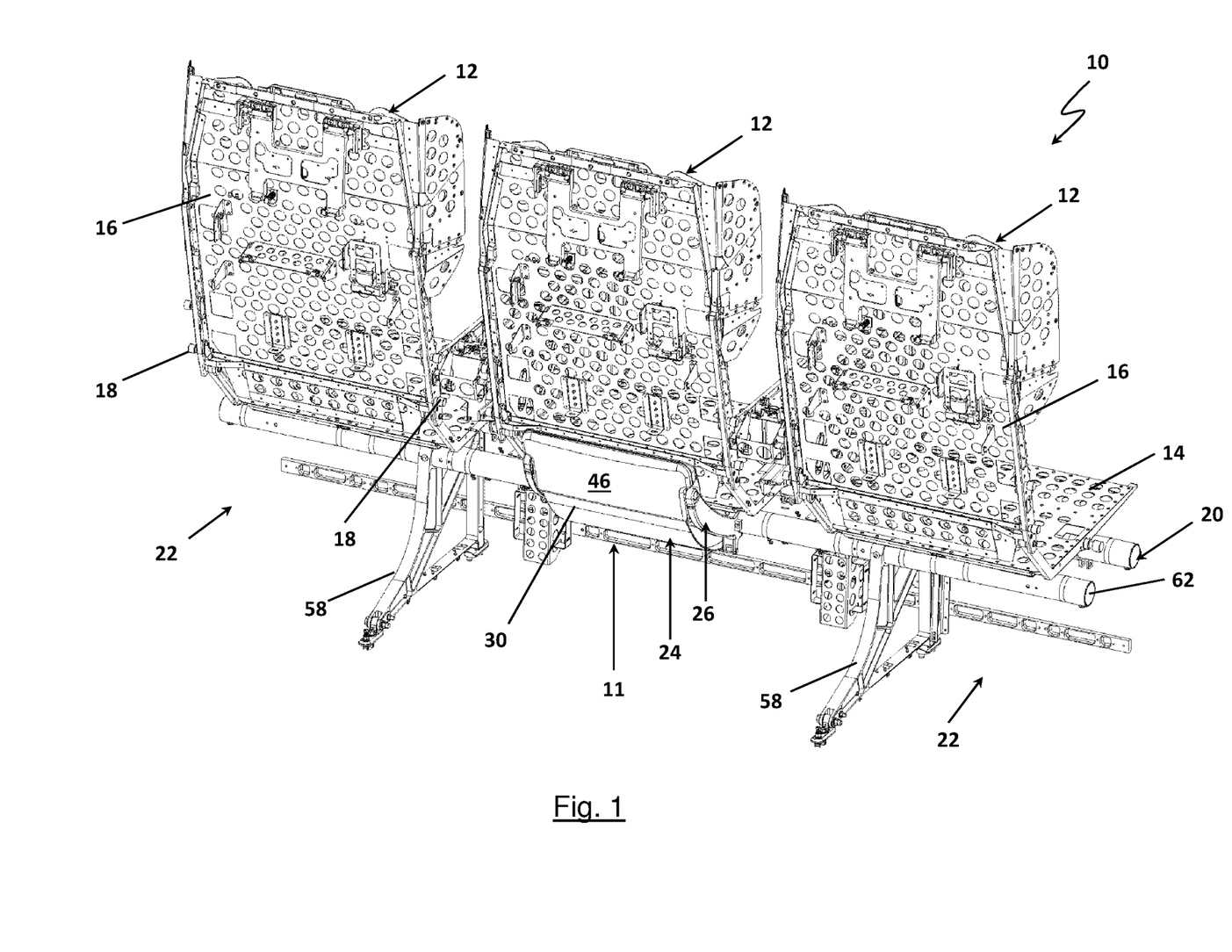
FIG. 1 is a perspective view of a seating assembly with deployable foot rest assembly embodying one aspect of the invention.
Figure 2:
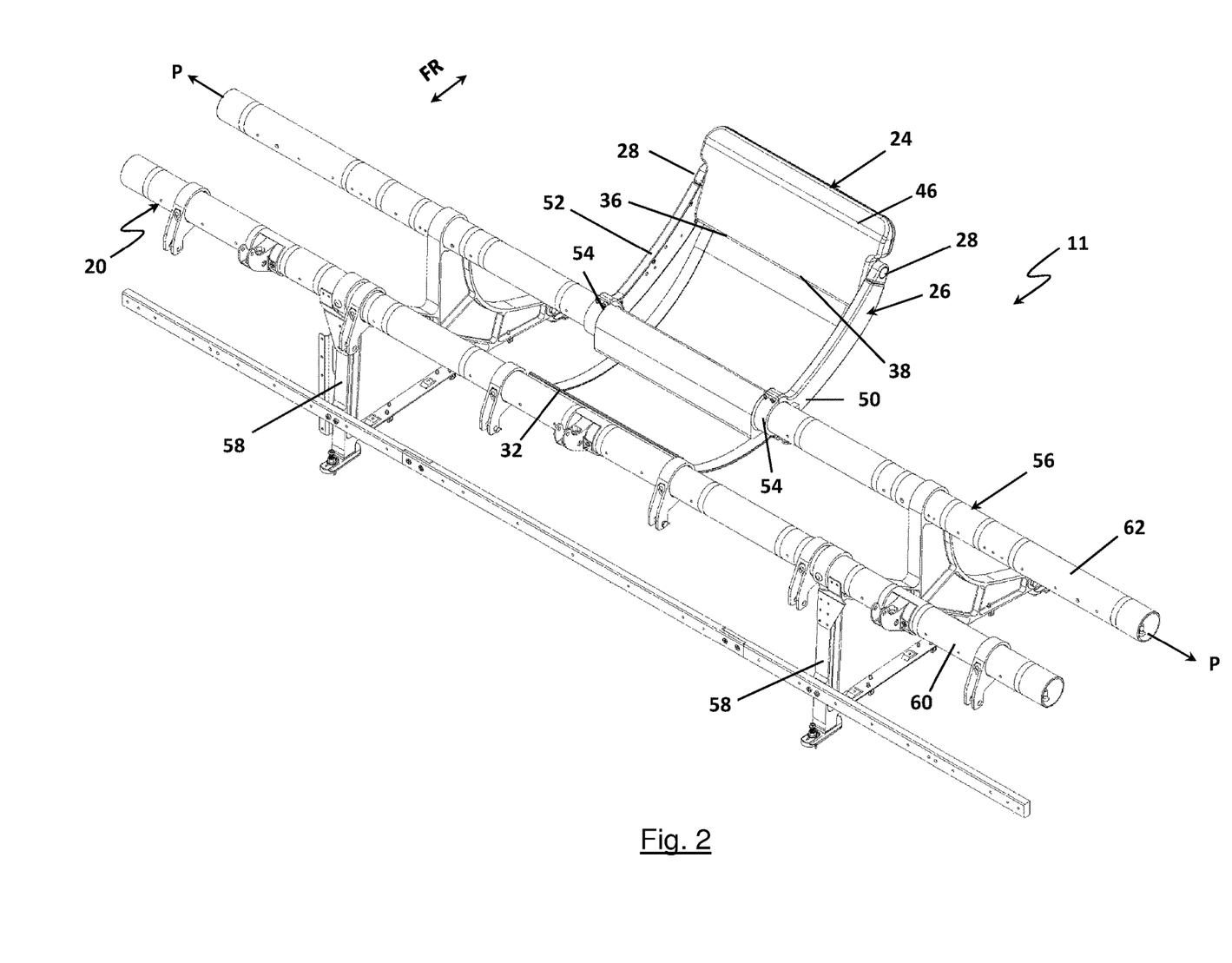
FIG. 2 is a perspective view of a base structure and the deployable foot rest assembly being part of the seating assembly of FIG. 1.
Figure 3:
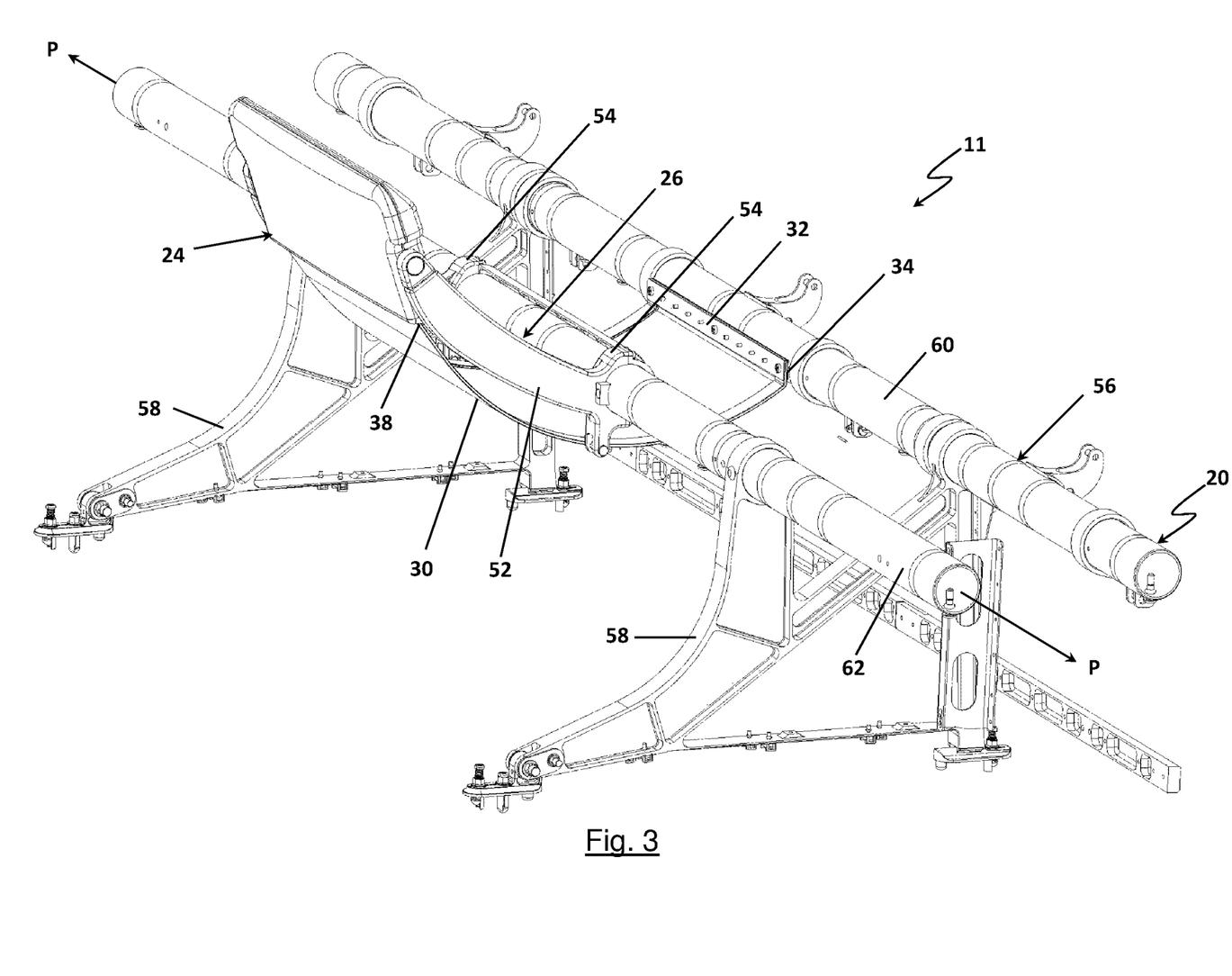
FIG. 3 is an alternative perspective view of a base structure and the deployable foot rest assembly being part of the seating assembly of FIG. 1.
Figure 4:
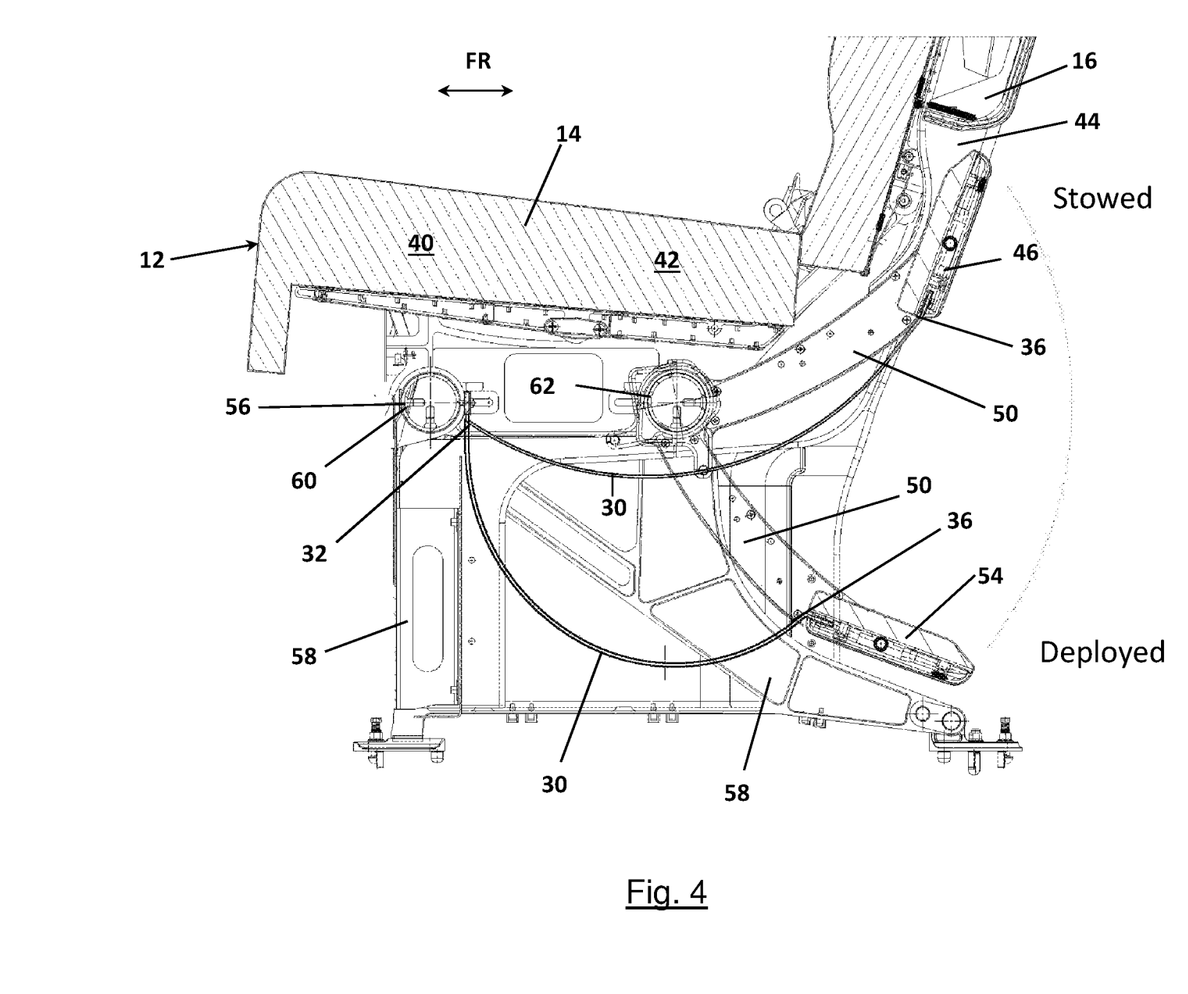
FIG. 4 is a side view of the seating assembly showing the deployable foot rest assembly both in a deployed state and a stowed state.

Referring now to the drawings there is shown, generally indicated as 10, a seating assembly embodying one aspect of the invention and incorporating a foot rest installation 11 embodying another aspect of the invention. The seating assembly 10 comprises at least one seat 12. In FIG. 1 three seats 12 are shown although more generally there may be one or more seats 12. Each seat 12 comprises a seat pan 14 and a seat back 16. FIG. 1 shows only the un-upholstered support structures for each of the seat pans 14 and seat backs, which may for example be made of metal or a composite material, e.g. a fibre-reinforced polymer. FIG. 4 shows an upholstered seat pan 14 and seat back 16. The seats 12 are typically of a reclining type in which the back 16 can pivot with respect to the seat pan 14. To this end the seat back 16 is pivotably coupled to seat pan 14 at joint 18.

The seating assembly 10 includes a base structure 20 for supporting the, or each, seat 12. In use the base structure 20 supports the seats 12 on a floor surface (not shown) such that the seats 12 are raised above the floor to create a space between the floor and the underside of the seats 12. This space provides a footwell 22 underneath each seat 12.

The seating assembly further includes, preferably for each seat 12, a respective foot rest assembly 24. Only the foot rest assembly 24 for the middle seat 12 of FIG. 1 is shown although the seating assembly 10 typically has a similar or identical foot rest assembly for each other seat 12. The foot rest assembly 24 is operable between a stowed state (as shown in FIGS. 1 to 4) and a deployed state (shown in FIG. 4). In the stowed state, the footwell 22 is unobstructed, or substantially unobstructed, by the foot rest assembly 24. In this state the footwell 22 is particularly suitable for use as a storage space although it may also be used to accommodate a person's feet. In the deployed state, the foot rest assembly 24 occupies the footwell 22 such that it is particularly suited for receiving a person's feet and lower legs (not shown).

The foot rest assembly 24 comprises a foot rest support structure 26 that is pivotable with respect to the base structure 20 about a pivot axis P that runs perpendicularly with a front-to-rear axis FR of the seat 12. In use, a seated passenger (not shown) is aligned with the front-to-rear axis FR, i.e. faces in to the front in a forward direction along the axis FR. Typically, when the seating assembly 10 is installed in a vehicle, especially an aircraft (not shown), the front-to-rear axis FR corresponds with the fore-and-aft axis of the vehicle although this need not necessarily be the case, e.g. when the seating is arranged diagonally across a vehicle. The pivot axis P is parallel with a lateral axis of the seat 12 and with a row of the seats 12 when more than one seat 12 is arranged in a row.

The foot rest support structure 26 has a free end 28 distal the pivot axis P, i.e. spaced apart from the pivot axis P and typically at the opposite end of the support structure 26 relative to the pivot axis P.

The foot rest assembly 24 includes a first foot rest component 30 comprising a flexible structure. The flexible structure 30 preferably comprises a sheet of flexible material, for example a flexible sheet of polymer material or other synthetic material or of a fabric material. Optionally the flexible structure 30 may comprise a net. In any event, the flexible structure 30 has a first end 32 fixed with respect to, conveniently fixed to but otherwise coupled to, the base structure 20 at a first location 34, and a second end 36, which is typically opposite the first end 32, coupled to the foot rest support structure 26 at a second location 38 that is spaced apart from the pivot axis P. Along said front-to-rear axis FR, the first location 34 is in line with a front part 40 of the seat 12, preferably a front part of the seat pan 14, and the pivot axis P is in line with a rear part 42 of the seat 12, preferably a rear part of the seat pan 14. In this context the front part of the seat and the rear part of the seat may be said to be located on opposite sides of a notional in-use vertical plane that bisects the seat pan 14 and is parallel to the pivot axis P.

In the stowed state, the foot rest support structure 26 extends upward (with respect to the floor in use) and rearward (along the front-to-rear axis) from the pivot axis P to position the free end 28 at a rear part 44 of the seat back 16, for example adjacent or against a rear surface of the seat back. Optionally the rear part 44 may comprise a recess for receiving the free end 28. Typically, the free end 28 is located out of and above the footwell 22 when stowed. As can best be seen from FIG. 4, in the stowed state the foot rest support structure 26 holds the flexible structure 30 in a raised position (compared to the deployed state) that is close to the underside of the seat 12. As such the flexible structure 30 does not obstruct the footwell 22. In contrast, in the deployed state the foot rest support structure 26 extends downward (with respect to the floor in use) and rearward (along the front-to-rear axis) from the pivot axis P to position the free end 28 at a relatively low position, typically adjacent the bottom of the footwell 22, in which it defines a gap beneath the seat 12 into which a passenger can place his feet and lower legs. In this state, the flexible structure 30 hangs, from its end 32, within the footwell 22, being supported at the other end 36 by the foot rest support structure 26. In the deployed state, the free end 28 is preferably in line with (along the front-to-rear axis) a rear part of the seat 12, typically the seat back 16.

The foot rest assembly 24 preferably includes a locking mechanism 70 (FIG. 5) operable between a locked state in which it prevents the foot rest support structure 26 from pivoting about the pivot axis P, and a non-locking state in which it allows the foot rest support structure 26 to pivot about the pivot axis P. The locking mechanism 70 is preferably configured to allow the support structure to be held in any angular position between the stowed and deployed states. The locking mechanism may comprise any suitable conventional mechanical locking mechanism. In the illustrated embodiment the locking mechanism 70 comprises a spring clip that is resiliently biased to grip the base structure (in particular bar 62 in this example) to prevent pivoting movement of the support structure 26 but which may be operated to release its grip to allow pivoting movement. Operation of the spring clip 70 may be effected by pulling a lever 72. The lever 72 may be attached to a cable 73 (FIGS. 6 and 7) which is connected to a user-operable control device 77 (FIGS. 6 and 7), which is conveniently located within the passenger's reach, e.g. on the back of the seat. The passenger is able to use the operating device 77 to operate the locking mechanism 70 to allow movement the foot rest support to a desired position and to lock it in position.

In preferred embodiments the foot rest assembly 24 includes a second foot rest component 46 located at the free end 28 of the foot rest support structure 26. In the stowed state, the second foot rest component 46 is held at the rear part 44 of the seat back 16, for example adjacent or against a rear surface of the seat back. The rear part 44 may comprise a recess for receiving the foot rest component 46. In preferred embodiments the second foot rest component 46 is located out of and above the footwell 22 when stowed. Preferably, the second foot rest component 46 comprises a foot plate although in alternative embodiments it may take other forms, e.g. one or more bars. The second foot rest component 46 may be fixedly mounted on the foot rest support structure 26, or may be pivotably mounted on the foot rest support structure 26 for pivoting about an axis parallel with the pivot axis P.

A locking mechanism (not shown) may be provided that is operable between a locked state in which it prevents the second foot rest component from pivoting with respect to said foot rest support structure, and a non-locking state in which it allows the second foot rest to pivot with respect to said foot rest support structure.

Figure 5:
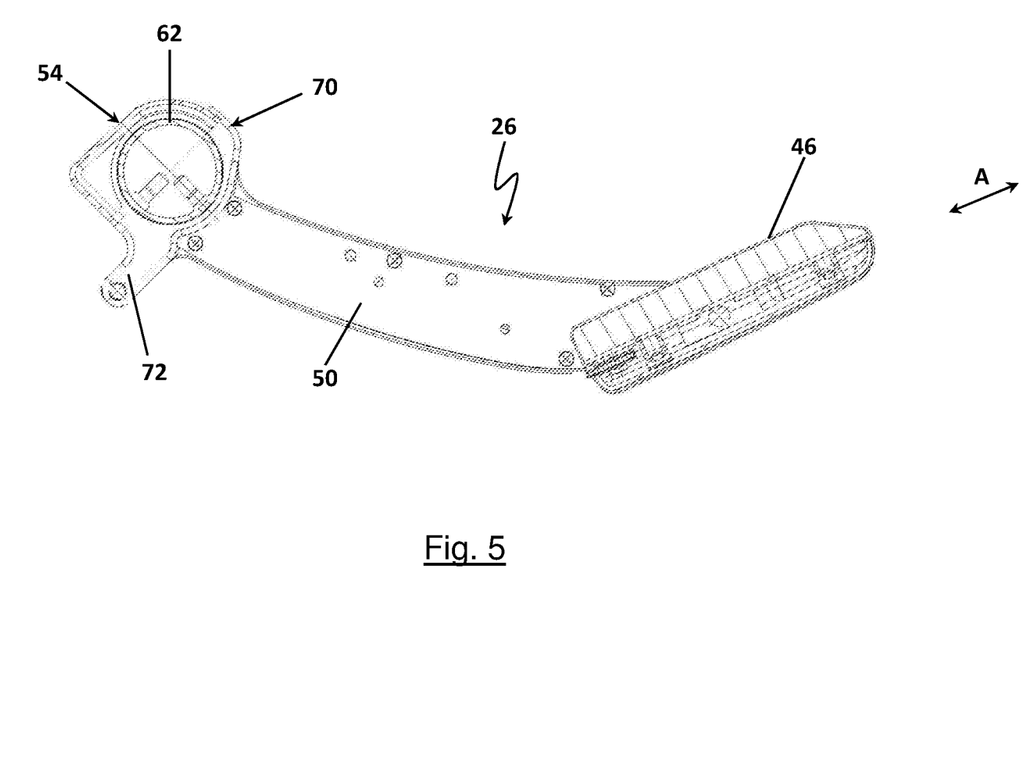
FIG. 5 is a side view of a foot rest support structure.

In preferred embodiments, the second foot rest 46 is slidable with respect to the foot rest support structure 26 in a direction perpendicular with the pivot axis P, and with the pivot axis of the foot rest 46 itself. The sliding movement, which is illustrated in FIG. 5 by arrow A, is typically at least partly along the front-to-rear axis depending on the angular position of the support structure 26. The sliding movement may be facilitated by providing mounting the foot rest 46 on a pin 74 that is provided on the support structure 26 and which rides in a slot 76 formed in the foot rest 46. The pin 74 may also provide the pivotable coupling between the foot rest 46 and the support structure 26. Preferably, a locking mechanism (not shown) is provided that is operable between a locked state in which it prevents the second foot rest 46 from sliding with respect to said foot rest support structure 26, and a non-locking state in which it allows the second foot rest to slide with respect to the foot rest support structure. The locking mechanism is preferably configured to allow the foot rest 46 to be locked in any one of a plurality of locations along its range of travel. The locking mechanism may comprise any suitable conventional mechanical locking mechanism.

In the preferred embodiment, the foot rest support structure 26 comprises first and second rigid bars 50, 52 spaced apart in the direction of the pivot axis P, each bar 50, 52 supporting a respective side of the flexible structure 30. The bars 50, 52 may support the flexible structure 30 indirectly, as for example shown in the illustrated embodiment in which the end 36 of the flexible structure 30 is fixed to the second foot rest component 26, or directly in which case the flexible structure 30 may be fixed directly to each bar 50, 52. In either case the location 38 at which the flexible structure 30 is coupled to the foot rest support structure 26 is spaced apart from the pivot axis P. Preferably, the second location 38 is at, or substantially at, the free end 28 of the foot rest support structure, and may be a location on the support structure 26 itself or on the second foot rest component 46.

Typically, the pivot axis P is located at a second end 54 of the foot rest support structure 26 opposite the free end 28. In the illustrated embodiment, each bar 50, 52 is pivotable at its second end 54 about the pivot axis P. Conveniently, the foot rest support structure 26 (and more particularly each bar 50, 52 in the illustrated embodiment) is pivotably coupled to the base structure 20 for pivoting about the pivot axis P.

In preferred embodiments, the base structure 20 comprises a seat support structure 56 and a plurality of legs 58. The footwell 22 is provided underneath the seat support structure 56, and typically between the legs 58. The seat support structure 56 is located under the seat pan 14 and is held above the floor by the legs 58. The seat support structure 56 may be said to be the underside of the seat 12. In the stowed state the foot rest support structure 26 holds the flexible structure 30 in a raised position (compared to the deployed state) that is close to, i.e. adjacent or against, the seat support structure 56.

In preferred embodiments, the foot rest support structure 26 is pivotably coupled to the seat support structure 56 for pivoting about the pivot axis P. In particular each bar 50, 52 is pivotably coupled to the seat support structure 56. The flexible structure 30 conveniently has its first end 32 fixed to the seat support structure 56 at the first location 34.

The preferred seat support structure 56 comprises first and second parallel seat support bars 60, 62 running perpendicular to the front-to-rear axis FR and, in use, parallel with the floor that supports the seating assembly. The first and second bars 60, 62 are spaced apart along the front-to-rear axis FR, and are preferably at substantially the same height above the floor in use. The first bar 60 is located forward of the second bar 62 along the front-to-rear axis FR. In particular the first bar 60 is in line with the front part 40 of the seat 12, preferably the front part of the seat pan 14, and the second bar 62 is in line with the rear part 42 of the seat 12, preferably the rear part of the seat pan 14.

Conveniently, the foot rest support structure 26 is pivotably coupled to the second bar 62 for pivoting about said pivot axis P. As such the second bar 62 is disposed along the pivot axis P and the first bar 60 is parallel with the pivot axis P. In the preferred embodiment each of the foot rest support bars 50, 52 is pivotably coupled to the second seat support bar 62. The flexible structure 30 may have its first end 32 fixed to the first bar 60 at the first location 34.

In preferred embodiments, the first location 34 and the pivot axis P are at substantially the same height, in use, above the floor. Preferably therefore the seat support bars 60, 62 are at substantially the same height, in use, above the floor.

In preferred embodiments, one or more actuator 80 is provided for facilitating movement of the foot rest support structure 26. Conveniently, the, or each, actuator 80 comprises a gas strut (also known as a gas spring), but could alternatively comprise any other suitable actuating device, e.g. a hydraulic or pneumatic ram, an electric actuator, or a spring (e.g. compression spring), or other resilient biasing device. The actuator 80 is coupled between the base 20, and more particularly the seat support structure 56 in the illustrated embodiment, and is configured to control movement of the foot rest structure 26, in particular to control pivoting movement of the foot rest support structure 26 about the pivot axis P. In preferred embodiments, the actuator 80 is configured to hold the foot rest structure 26 in, and urge it towards, a rest position (FIG. 7), in which the foot rest support structure 26 is deployed out of the stowed state, but is in a relatively raised position in comparison with the fully deployed position (FIG. 4). To this end the actuator 80 may be configured to provide a bias against movement of the foot rest support structure 26 towards the fully deployed position that balances with the weight (or more particularly the turning moment) of the foot rest support structure 26 when the foot rest support structure 26 is in the rest position. The preferred arrangement is such that, starting from the stowed state, in the absence of other forces, the foot rest support structure 26 moves under the influence of gravity unit it reaches the rest position at which point it is held in position by the action of the actuator 80. Starting from the fully deployed position (or other deployed position that is further from the stowed state than the rest position), the actuator 80 acts to move the foot rest support structure 26 towards and into the rest position.

Figures 6, 6A:
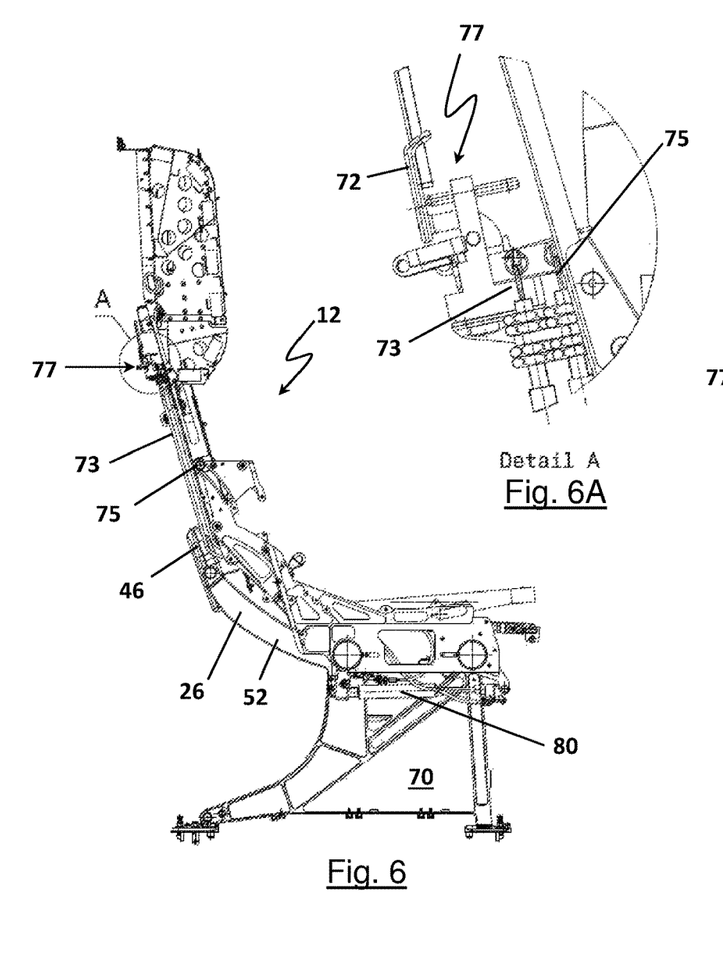
FIG. 6 is a side view of the seating assembly showing the foot rest assembly in the stowed state.
FIG. 6A is an enlarged view of a user-operable device for facilitating use of the foot rest assembly.
Figures 7, 7A:
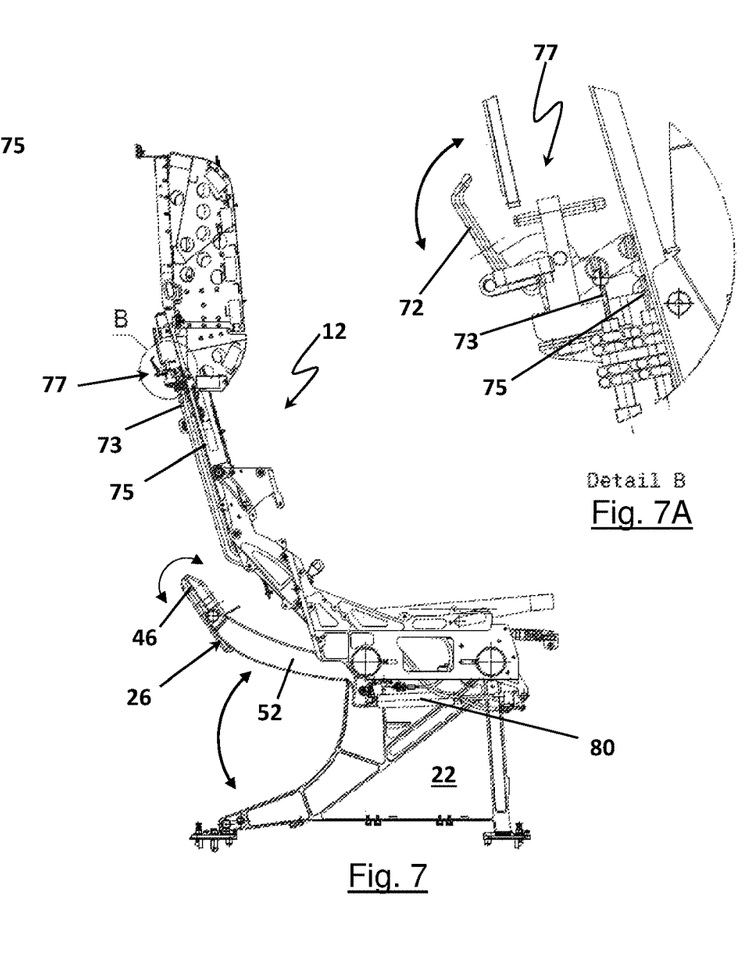
FIG. 7 is a side view of the seating assembly showing the foot rest assembly in a rest position.
FIG. 7A is an enlarged view of the user-operable device for facilitating use of the foot rest assembly.

The passenger is able to use the operating device 77 to operate the locking mechanism 70 to allow movement the foot rest support to a desired position and to lock it in position. For example, in FIG. 6, the foot rest support structure 26 is locked in its stowed state. FIG. 6A shows the operating device 77 in its locking state. FIG. 7A shows the operating device 77 in its non-locking state, and FIG. 7 shows how, in response to this transition, the foot rest support structure 26 moves to the rest position. While the operating device 77 remains in its non-locking state, the passenger is manually able to move the foot rest support structure 26 towards the fully deployed position. At any position during this movement, the passenger may operate the device 77 to its locking state in order to hold the foot rest support structure 26 at a desired position. Hence, in the deployed state, the foot rest support structure 26 may be in any one of a plurality of deployed positions (e.g. between the rest position of FIG. 7 and the fully deployed position of FIG. 4). In preferred embodiments, movement of the foot rest support structure 26 away from the stowed state is resisted by the actuator 80. This improves user-control of the movement and provides a quality-feel to the movement. When the passenger wishes to return the foot rest support structure 26 to the stowed state, or otherwise adjust its position, he operates the mechanism to the non-locking state, upon which in the absence of other forces, the actuator 80 moves the foot rest support structure 26 towards and into the rest position. The passenger may move the foot rest support structure 26 from the rest position into the stowed state manually. The stowed state is maintained so long as the operating device 77 is in its locking state.

In preferred embodiments, the actuator 80 is lockable, e.g. comprising a lockable gas strut, and an operating device may be provided for locking and unlocking the actuator 80. Conveniently, the same operating device 77 operates both the lock 70 and the actuator 80. To this end, a second cable 75 may be provided between the operating device 77 and the actuator 80 for operating the actuator. In any event, when the operating device 77 is in its locking state, the actuator 80 is locked in its relative state of extension/retraction. When the operating device 77 is in its non-locking state, the actuator 80 either allows the user to manually move the foot rest support structure 26, or to actuator 80 moves the foot rest support structure 26 towards the rest state as described above.

The operating device 77 may comprise any convenient mechanical device, for example a lever mechanism as shown by way of example in FIGS. 6A and 7A, but may alternatively take any other convenient form, e.g. electromechanical or electronic. For non-mechanical devices, the link between the operating device 77 and lock 70 may be provided electrically by a wired or wireless link, rather than by cable 73, 75.

In some embodiments, the seating assembly 10 may have a single seat 12. More typically the seating assembly 10 has two or more of the seats 12 arranged in a row, for example as shown in FIG. 1 where the seating assembly has three seats 12. The seats 12 in the row may be aligned with each other along the front-to-rear axis FR (as illustrated), in which case the row extends in a direction parallel with the pivot axis P. Alternatively the seats 12 in the row may be staggered, or offset, with respect to each other such that the row extends obliquely to the pivot axis P. In any case, each seat 12 of the row may be provided on the same base structure 20 with respective footwell 22 beneath each seat 12, each seat 12 having and a respective foot rest support assembly 24.

In use, a plurality of the seating assemblies 10 are provided together as a seating installation, for example on an aircraft or other vehicle, wherein each seating assembly 10 is spaced apart from at least one other of the seating assemblies 10 in a direction parallel with the front-to-rear axis FR. The or each seat 12 of each seating assembly 10 is aligned with a respective seat 12 of the or each adjacent seating assembly 10, i.e. of the seating assembly in front and/or behind as applicable. The arrangement is such that a passenger seated in any given seat 12 is able to use the footwell 22 and/or foot rest assembly 24 of the seat 12 in front.

Alternatively, the foot rest installation may be incorporated into a seating installation in which the, or each, seat in each row is staggered with respect to (i.e. not aligned with in the front to rear direction) the or each seat in the or each adjacent row. In such cases, a console may be provided adjacent each seat (typically with one console between each pair of adjacent seats), each seat of one row being aligned with a console in the row in front. The console may serve as the base structure and may provide a footwell for use by a passenger in the aligned seat of the row behind. The foot rest assembly described herein may be incorporated into the console footwell rather than beneath the forward seat.

Alternatively still, the foot rest installation may be incorporated into a seating installation in which the, or each, seat in a row faces a bulkhead. The bulkhead may serve as the base structure and may provide a footwell for use by a passenger in an aligned seat. The foot rest assembly described herein may be incorporated into the bulkhead footwell rather than beneath the forward seat.

The invention is not limited to the embodiment(s) described herein but can be amended or modified without departing from the scope of the present invention.

The invention claimed is:

1. A foot rest installation comprising:
a base structure including a footwell;
a foot rest assembly operable between a stowed state and a deployed state, said foot rest assembly comprising:
a foot rest support structure pivotable with respect to said base structure about a pivot axis that runs perpendicularly with a front-to-rear axis, said foot rest support structure having a free end distal said pivot axis; and
a first foot rest component comprising a flexible structure having a first end fixed with respect to said base structure at a first location, and a second end coupled to said foot rest support structure at a second location that is spaced apart from said pivot axis along said front-to-rear axis,
and wherein, in said deployed state, said foot rest support structure extends downward and rearward from said pivot axis to deploy said flexible structure in said footwell,
and wherein, in said stowed state, said foot rest support structure extends upward and rearward from said pivot axis.

2. The foot rest installation of claim 1, wherein said foot rest assembly includes a second foot rest component located at said free end of said foot rest support structure, and wherein said second foot rest component may be pivotably mounted on said foot rest support structure for pivoting with respect to said foot rest support structure about an axis parallel with said pivot axis, and/or is slidable with respect to said foot rest support structure in a direction perpendicular with said pivot axis.

3. The foot rest installation of claim 1, further including a foot rest locking mechanism for selectably locking said foot rest support structure in any selected one of a plurality of positions between said stowed state and a fully deployed position, and a user-operable device for operating said locking mechanism.

4. The foot rest installation of claim 1, wherein said foot rest support structure comprises first and second bars spaced apart in the direction of said pivot axis, each bar supporting a respective side of said flexible structure.

5. The foot rest installation of claim 1, wherein said pivot axis is located at a second end of said foot rest support structure opposite said free end.

6. The foot rest installation of claim 1 wherein said flexible structure comprises a sheet of flexible material, a polymer material or a fabric, or a net.

7. The foot rest installation of claim 1 wherein in said stowed state said foot rest support structure holds said flexible structure in a raised position relative to said deployed state.

8. The foot rest installation of claim 1 wherein said flexible structure has said first end fixed to said base structure at said first location.

9. The foot rest installation of claim 1 wherein said first location and said pivot axis are at substantially the same height, in use, above a floor supporting the foot rest installation.

10. The foot rest installation of claim 1 wherein, in said stowed state, said free end of said foot rest support structure is located outside of, and above, said footwell.

11. The foot rest installation of claim 1, wherein said base structure supports at least one seat, the or each seat comprising a seat pan and a seat back, said footwell being located underneath said seat pan, said pivot axis running perpendicularly with a front-to-rear axis of said seat, and wherein, along said front-to-rear axis of said seat, said first location is in line with a front part of said seat and said pivot axis is in line with a rear part of said seat.

12. The foot rest installation of claim 11, wherein, in said stowed state, said foot rest support structure extends upward and rearward from said pivot axis to position said free end at a rear part of said seat back.

13. The foot rest installation of claim 11, wherein a free end of said foot rest support structure is held adjacent or against rear of said seat back in said stowed state.

14. The foot rest installation of claim 11 wherein, along said front-to-rear axis, said pivot axis is in line with a rear part of said seat pan.

15. The foot rest installation of claim 11 wherein said base structure comprises a seat support structure and a plurality of legs, said footwell being provided underneath said seat support structure, and between said legs, and wherein, said foot rest support structure is pivotably coupled to said seat support structure for pivoting about said pivot axis.

16. The foot rest installation of claim 15, wherein said seat support structure comprises first and second parallel bars running perpendicular to said front-to-rear axis and, in use, parallel with a floor supporting the seating assembly, said first and second bars being spaced apart along said front-to-rear axis, and being at substantially the same height above said floor in use, wherein said foot rest support structure is pivotably coupled to said second bar for pivoting about said pivot axis and said flexible structure has said first end fixed to said first bar at said first location.

17. The foot rest installation of claim 1, wherein at least one actuator is coupled between the base structure and the foot rest support structure and is configured to control movement of the foot rest structure.

18. The foot rest installation of claim 17, wherein said at least one actuator is configured to hold the foot rest support structure in, and/or to urge it towards, a rest position in which the foot rest support structure is out of the stowed state, but not in a fully deployed position, wherein said at least one actuator is configured to provide a bias against movement of the foot rest support structure towards the fully deployed position and to balances the weight of the foot rest support structure when the foot rest support structure is in the rest position.

19. The foot rest installation of claim 17, further including an actuator locking mechanism for selectably locking said at least one actuator in any state of extension, and a user-operable device for operating said locking mechanism, and wherein, the same user-operable device operates the foot rest locking mechanism and the actuator locking mechanism.

20. A foot rest installation comprising:
a base structure including a footwell;
a foot rest assembly operable between a stowed state and a deployed state, said foot rest assembly comprising:
a foot rest support structure pivotable with respect to said base structure about a pivot axis that runs perpendicularly with a front-to-rear axis, said foot rest support structure having a free end distal said pivot axis; and
a first foot rest component comprising a flexible structure having a first end fixed with respect to said base structure at a first location, and a second end coupled to said foot rest support structure at a second location that is spaced apart from said pivot axis along said front-to-rear axis,
and wherein, in said deployed state, said foot rest support structure extends downward and rearward from said pivot axis to deploy said flexible structure in said footwell,
and wherein, in said stowed state, said foot rest support structure extends upward and rearward from said pivot axis;
a locking mechanism operable between a locked state in which it prevents the foot rest support structure from pivoting about said pivot axis, and a non-locking state in which it allows the foot rest support structure to pivot about said pivot axis.

21. A seating assembly comprising:
a seat comprising a seat pan and a seat back;
a base structure supporting the seat, the base structure providing a footwell underneath said seat pan;
a foot rest assembly operable between a stowed state and a deployed state, said foot rest assembly comprising:
a foot rest support structure pivotable with respect to said base structure about a pivot axis that runs perpendicularly with a front-to-rear axis of said seat, said foot rest support structure having a free end distal said pivot axis; and
a first foot rest component comprising a flexible structure having a first end fixed with respect to said base structure at a first location, and a second end coupled to said foot rest support structure at a second location that is spaced apart from said pivot axis,
wherein, along said front-to-rear axis, said first location is in line with a front part of said seat and said pivot axis is in line with a rear part of said seat,
and wherein, in said deployed state, said foot rest support structure extends downward and rearward from said pivot axis to deploy said flexible structure in said footwell,
and wherein, in said stowed state, said foot rest support structure extends upward and rearward from said pivot axis to position said free end at a rear part of said seat back.

* * * * *